US008906330B2

(12) United States Patent
Hilgendorff et al.

(10) Patent No.: US 8,906,330 B2
(45) Date of Patent: Dec. 9, 2014

(54) LEAN HC CONVERSION OF TWC FOR LEAN BURN GASOLINE ENGINES

(75) Inventors: Marcus Hilgendorff, Hannover (DE); Wen Mei Xue, Dayton, NJ (US); Cesar Tolentino, Bloomfield, NJ (US)

(73) Assignee: BASF Corporation, Florham Park, NJ (US)

( * ) Notice: Subject to any disclaimer, the term of this patent is extended or adjusted under 35 U.S.C. 154(b) by 1202 days.

(21) Appl. No.: 12/810,140

(22) PCT Filed: May 4, 2010

(86) PCT No.: PCT/US2010/033457
§ 371 (c)(1),
(2), (4) Date: Jun. 22, 2010

(87) PCT Pub. No.: WO2010/129490
PCT Pub. Date: Nov. 11, 2010

(65) Prior Publication Data
US 2013/0189173 A1 Jul. 25, 2013

Related U.S. Application Data

(60) Provisional application No. 61/175,312, filed on May 4, 2009.

(51) Int. Cl.
| | |
|---|---|
| B01D 53/94 | (2006.01) |
| B01J 23/00 | (2006.01) |
| B01J 23/02 | (2006.01) |
| B01J 23/40 | (2006.01) |
| B01J 23/42 | (2006.01) |
| B01J 23/44 | (2006.01) |
| B01J 23/56 | (2006.01) |
| B01J 21/00 | (2006.01) |
| B01J 21/04 | (2006.01) |
| B01J 20/00 | (2006.01) |
| B01J 23/46 | (2006.01) |
| B01J 37/02 | (2006.01) |
| B01J 23/63 | (2006.01) |

(52) U.S. Cl.
CPC ......... *B01J 23/464* (2013.01); *B01D 2255/206* (2013.01); *Y02T 10/22* (2013.01); *B01J 37/0244* (2013.01); *B01J 23/63* (2013.01); *B01J 23/40* (2013.01); *B01D 2255/1021* (2013.01); *B01D 53/945* (2013.01); *B01D 2255/1025* (2013.01); *B01D 2255/20715* (2013.01); *B01D 53/9454* (2013.01); *B01D 2258/014* (2013.01); *B01D 2255/1023* (2013.01); *B01D 2255/2092* (2013.01); *B01J 23/002* (2013.01); *B01D 2255/9025* (2013.01); *B01D 2255/407* (2013.01); *B01D 2255/2042* (2013.01); *B01J 2523/00* (2013.01); *Y10S 502/52712* (2013.01); *Y10S 502/52713* (2013.01); *Y10S 502/52718* (2013.01); *Y10S 502/52719* (2013.01)

USPC ........ 423/213.5; 502/258; 502/259; 502/260; 502/261; 502/262; 502/263; 502/326; 502/332; 502/333; 502/334; 502/339; 502/355; 502/415; 502/439; 502/527.12; 502/527.13; 502/527.18; 502/527.19

(58) Field of Classification Search
USPC ......... 502/258–263, 326, 332–334, 339, 355, 502/415, 439, 527.12, 527.13, 527.18, 502/527.19; 423/213.5
See application file for complete search history.

(56) References Cited

U.S. PATENT DOCUMENTS

| | | | |
|---|---|---|---|
| 5,041,407 A | 8/1991 | Williamson et al. | |
| 6,777,370 B2 * | 8/2004 | Chen | 502/241 |
| 6,875,725 B2 * | 4/2005 | Lindner et al. | 502/328 |
| 7,022,646 B2 * | 4/2006 | Li | 502/339 |
| 7,041,622 B2 * | 5/2006 | Nunan | 502/327 |
| 7,081,430 B2 * | 7/2006 | Uenishi et al. | 502/327 |
| 7,374,729 B2 * | 5/2008 | Chen et al. | 422/177 |
| 7,517,510 B2 * | 4/2009 | Chen et al. | 423/213.2 |
| 7,550,124 B2 * | 6/2009 | Chen et al. | 423/213.2 |
| 7,576,031 B2 * | 8/2009 | Beutel et al. | 502/339 |
| 7,709,414 B2 * | 5/2010 | Fujdala et al. | 502/326 |
| 7,749,472 B2 * | 7/2010 | Chen et al. | 423/213.2 |
| 7,754,171 B2 * | 7/2010 | Chen et al. | 423/213.2 |
| 7,758,834 B2 * | 7/2010 | Chen et al. | 423/213.2 |
| 7,795,172 B2 * | 9/2010 | Foong et al. | 502/327 |
| 7,875,250 B2 * | 1/2011 | Nunan | 422/177 |
| 7,879,755 B2 * | 2/2011 | Wassermann et al. | 502/304 |
| 7,931,874 B2 * | 4/2011 | Han et al. | 422/177 |
| 8,007,750 B2 * | 8/2011 | Chen et al. | 423/239.1 |
| 8,038,951 B2 * | 10/2011 | Wassermann et al. | 422/168 |
| 8,066,963 B2 * | 11/2011 | Klingmann et al. | 423/213.5 |
| 8,153,549 B2 * | 4/2012 | Cho et al. | 502/327 |
| 8,168,560 B2 * | 5/2012 | Taki et al. | 502/304 |
| 8,211,392 B2 * | 7/2012 | Grubert et al. | 423/213.2 |
| 2007/0134145 A1 | 6/2007 | Strehlau et al. | |

(Continued)

FOREIGN PATENT DOCUMENTS

| | | |
|---|---|---|
| DE | 102008048854 A1 | 4/2010 |
| EP | 1974809 A1 | 3/2007 |
| WO | 0218753 A1 | 3/2002 |
| WO | 03100228 A1 | 12/2003 |
| WO | 2007090617 A3 | 8/2007 |

(Continued)

Primary Examiner — Cam N. Nguyen
(74) Attorney, Agent, or Firm — Melanie L. Brown

(57) ABSTRACT

The present invention relates to a catalyst composition comprising a carrier substrate, a layer (i) coated on said carrier substrate comprising at least one precious group metal, a layer (ii) comprising Rh, and a layer (iii) comprising Pd and/or Pt and being substantially free of Ce, Ba and Rh, wherein the layer (iii) has a lower weight than the layer (i) or the layer (ii). Furthermore, the present invention relates to a method for treating an exhaust gas stream using said catalyst composition.

14 Claims, No Drawings

(56) References Cited

U.S. PATENT DOCUMENTS

2008/0042104 A1    2/2008  Chen et al.
2008/0044329 A1    2/2008  Chen et al.
2008/0044330 A1*   2/2008  Chen et al. ............... 423/213.5
2008/0045404 A1*   2/2008  Han et al. ..................... 502/66

FOREIGN PATENT DOCUMENTS

| WO | 2008113457 A1 | 9/2008 |
| WO | 2009020957 A1 | 2/2009 |
| WO | 2009023468 A3 | 2/2009 |

* cited by examiner

LEAN HC CONVERSION OF TWC FOR LEAN BURN GASOLINE ENGINES

CROSS-REFERENCE TO RELATED APPLICATIONS

This is a National Stage application of PCT International Application No. PCT/US10/33457 filed May 4, 2010 that claimed the benefit pursuant to 35 U.S.C. §119(e) of U.S. Provisional Patent Application Ser. No. 61/175,312 filed May 4, 2009 which are incorporated by reference herein in their entireties.

FIELD OF THE INVENTION

This invention relates to layered catalysts used to treat exhaust gas steams, in particular exhaust gas streams containing hydrocarbons, carbon monoxide, and oxides of nitrogen.

BACKGROUND OF THE INVENTION

Three-way conversion (TWC) catalysts have utility in a number of fields including the treatment of exhaust gas streams from internal combustion engines, such as automobile, truck and other gasoline-fueled engines. Emission standards for unburned hydrocarbons, carbon monoxide and nitrogen oxide contaminants have been set by various governments and must be met by older as well as new vehicles. In order to meet such standards, catalytic converters containing a TWC catalyst are located in the exhaust gas line of internal combustion engines. Such catalysts promote the oxidation by oxygen in the exhaust gas stream of unburned hydrocarbons and carbon monoxide as well as the reduction of nitrogen oxides to nitrogen.

Known TWC catalysts which exhibit good activity and long life comprise one or more platinum group metals (e.g., platinum, palladium, rhodium, rhenium, and iridium) disposed on a high surface area, refractory metal oxide support, e.g., a high surface area alumina coating. The support is carried on a suitable carrier or substrate such as a monolithic carrier comprising a refractory ceramic or metal honeycomb structure, or refractory particles such as spheres or short, extruded segments of a suitable refractory material. TWC catalysts can be manufactured in many ways. U.S. Pat. No. 6,478,874, for example, sets forth a system for catalytic coating of a substrate. Details of a TWC catalyst are found in, for example, U.S. Pat. Nos. 4,714,694 and 4,923,842. Furthermore, U.S. Pat. Nos. 5,057,483, 5,597,771, 7,022,646, and WO 95/35152 disclose TWC catalysts having two layers with precious metals. U.S. Pat. No. 6,764,665 discloses a TWC catalyst having three layers, two of which have precious metals.

WO 2008/024708 discloses a layered, three-way conversion catalyst having the capability of simultaneously catalyzing the oxidation of hydrocarbons and carbon monoxide and the reduction of nitrogen oxides. In one or more embodiments, the catalyst comprises three layers in conjunction with a carrier: a first layer deposited on the carrier and comprising palladium deposited on a refractory metal oxide and an oxygen storage component; a second layer deposited on the first layer and comprising rhodium deposited on a refractory metal oxide and an oxygen storage component; and a third layer deposited on the second layer and comprising palladium deposited on a refractory metal oxide.

WO 2008/097702 relates to a multilayered, three-way conversion catalyst having the capability of simultaneously catalyzing the oxidation of hydrocarbons and carbon monoxide and the reduction of nitrogen oxides. Disclosed is a catalytic material of at least four layers in conjunction with a carrier, where each of the layers includes a support, at least three layers comprise a precious metal component, and at least one layer comprises an oxygen storage component (OSC). The catalytic material can further comprise a fifth layer, where at least four layers comprise a precious metal component, at least one layer comprises an oxygen storage component, and at least one layer is substantially free of an oxygen storage component.

Multilayered catalysts are widely used in TWO. Generally, vehicles require catalysts having the same general overall conversion functionalities, but different vehicle platforms dictate the configurations on the catalyst of individual functions. For example, the engine control of a particular vehicle dictates whether, for example, HC or NOx conversion will be the determining factor to meet regulation targets. These critical factors lead to catalysts designed with different outermost layer favoring either HC or NOx conversion. As such, there is need to provide TWC catalysts that meet market needs, without introducing complexities into the manufacturing process. There is also a goal to utilize components of TWO catalysts, especially the precious metals, as efficiently as possible.

Multilayered catalysts are formed by deposition of washcoats onto the carriers or substrates. In some manufacturing processes, deposition of washcoats along a length of the carrier or substrate is limited. For example, sometimes a single pass of a washcoat covers less than 100% of the length of the catalyst, for example, only about 80-90%.

It is a continuing goal to develop three-way conversion catalyst systems that have the ability to oxidize hydrocarbons and carbon monoxide while reducing nitrogen oxides to nitrogen.

SUMMARY OF THE INVENTION

The present invention relates to a catalyst composition comprising:
   a carrier substrate;
   a layer (i) coated on said carrier substrate comprising at least one precious group metal;
   a layer (ii) comprising Rh;
   a layer (iii) comprising Pd and/or Pt and being substantially free of Ce, Ba and Rh,
   wherein the layer (iii) has a lower weight than the layer (i) or the layer (ii).

According to a further embodiment, the present invention relates to a catalyst composition as disclosed above, wherein the layer (ii) is coated over the layer (i) and the layer (iii) is coated over the layer (ii).

According to another embodiment, the present invention relates to a catalyst composition as disclosed above, wherein the layer (iii) is coated over the layer (i) and the layer (ii) is coated over the layer (iii).

Furthermore, the present invention relates to a method for treating an exhaust gas stream, the method comprising the steps of:
   (i) providing a catalyst composition comprising:
      a carrier substrate;
      a layer (i) coated on said carrier substrate comprising at least one precious group metal;
      a layer (ii) comprising Rh;
      a layer (iii) comprising Pd and/or Pt and being substantially free of Ce, Ba and Rh,
      wherein the layer (iii) has a lower weight than the layer (i) or the layer (ii);

(ii) contacting said exhaust gas stream with said catalyst composition for the treatment of exhaust gas emissions.

DETAILED DESCRIPTION OF THE INVENTION

The present invention relates to a layered catalyst composition of the type generally referred to as a three-way conversion (TWO) catalyst. These TWC catalysts are polyfunctional in that they have the capability of substantially simultaneously catalyzing the oxidation of hydrocarbons and carbon monoxide and the reduction of nitrogen oxides. The relative layers of the catalyst composite and the specific composition of each such layer provide a stable, economical system. This enables the enhanced oxidation of hydrocarbons and carbon monoxide as well as effective conversion of nitrogen oxide compounds to nitrogen.

In particular, the present invention relates to a catalyst composition comprising:
a carrier substrate;
a layer (i) coated on said carrier substrate comprising at least one precious group metal;
a layer (ii) comprising Rh;
a layer (iii) comprising Pd and/or Pt and being substantially free of Ce, Ba and Rh,
wherein the layer (iii) has a lower weight than the layer (i) or the layer (ii).

According to the present invention, the catalyst composition comprises at least a carrier substrate and three layers (i), (ii), and (iii).

Reference to "substantially free of Ce, Ba and Rh" means that Ce and Ba may be present at a level of less than or equal to approximately 0.1%. Rh may be present at a level of less than or equal to approximately 100 ppm.

According to the present invention, layer (i) is coated over the carrier substrate. Layer (ii) may be coated over layer (i). In this case, layer (iii) is coated over layer (ii). According to an alternative embodiment, layer (iii) may be coated over layer (i). In this case, layer (ii) is coated over layer (iii).

Therefore, according to one embodiment, the present invention relates to a catalyst composition as disclosed above, wherein the layer (ii) is coated over the layer (i) and the layer (iii) is coated over the layer (ii).

According to an alternative embodiment, the present invention relates to a catalyst composition as disclosed above, wherein the layer (iii) is coated over the layer (i) and the layer (ii) is coated over the layer (iii).

The catalyst composition according to the present invention can also comprise further layers. These layers can be arranged in any order and can also be intermediate layers between any of the layers or the carrier substrate disclosed above. According to the present invention additional layers may comprise any suitable material, for example a porous material, e.g. a base metal oxide and transition metal oxide, or a microporous material.

Preferably, the catalyst composition according to the present invention only comprises the carrier substrate, and layers (i), (ii), and (iii).

According to the present invention, the layer (iii) has a lower weight than the layer (i) or the layer (ii). In the context of the present invention, the weight of layer (iii) is preferably only about 90% or less of the weight of the layer (i), more preferably about 85% or less of the weight of the layer (i), in particular only about 80% or less of the weight of the layer (i), for example 80% to 50% of the weight of the layer (i).

Therefore, according to a further embodiment, the present invention relates to a catalyst composition as disclosed above, wherein the weight of the layer (iii) is about 80% or less of the weight of the layer (i).

The catalyst composition of the present invention comprises a carrier substrate. In principle, any suitable carrier substrate known to the person skilled in the art can be used in the context of the present invention.

According to one or more embodiments, the carrier substrate may be any of those materials typically used for preparing TWC catalysts and will typically comprise a metal or ceramic honeycomb structure. Any suitable carrier may be employed, such as a monolithic carrier of the type having a plurality of fine, parallel gas flow passages extending therethrough from an inlet or an outlet face of the carrier, such that passages are open to fluid flow therethrough. The passages, which are essentially straight paths from their fluid inlet to their fluid outlet, are defined by walls on which the catalytic material is coated as a "washcoat" so that the gases flowing through the passages contact the catalytic material. As used herein, the term "washcoat" has its usual meaning in the art of a thin, adherent coating of a catalytic or other material applied to a substrate carrier material which is sufficiently porous to permit the passage there through of the gas stream being treated. The flow passages of the monolithic carrier are thin-walled channels which can be of any suitable cross-sectional shape and size such as trapezoidal, rectangular, square, sinusoidal, hexagonal, oval, circular, etc. Such structures may contain from about 60 to about 1200 or more gas inlet openings (i.e., "cells") per square inch of cross section.

The carrier substrate can also be a wall-flow filter substrate, where the channels are alternately blocked, allowing a gaseous stream entering the channels from one direction (inlet direction), to flow through the channel walls and exit from the channels from the other direction (outlet direction). A dual oxidation catalyst composition can be coated on the wall-flow filter. If such a carrier is utilized, the resulting system will be able to remove particulate matters along with gaseous pollutants. The wall-flow filter carrier can be made from materials commonly known in the art, such as cordierite or silicon carbide.

The ceramic carrier may be made of any suitable refractory material, e.g., cordierite, cordierite-alumina, in particular cordierite-alpha-alumina, silicon nitride, zircon mullite, spodumene, alumina-silica magnesia, zircon silicate, sillimanite, magnesium silicates, zircon, petalite, alumina, in particular alpha-alumina, aluminosilicates and the like.

The carriers useful for the catalyst compositions of embodiments of the present invention may also be metallic in nature and be composed of one or more metals or metal alloys. The metallic carriers may be employed in various shapes such as corrugated sheet or monolithic form. Exemplary metallic supports include the heat resistant metals and metal alloys such as titanium and stainless steel as well as other alloys in which iron is a substantial or major component. Such alloys may contain one or more of nickel, chromium and/or aluminum, and the total amount of these metals may comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The surface or the metal carriers may be oxidized at high temperatures, e.g., 1000° C. and higher, to improve the corrosion resistance of the alloy by forming an oxide layer on the surface the carrier. Such high temperature-induced oxidation may enhance the adherence of the refractory metal oxide support and catalytically-promoting metal components to the carrier.

In alternative embodiments, the catalyst composition may be deposited on an open cell foam substrate. Such substrates are well known in the art, and are typically formed of refractory ceramic or metallic materials.

The catalyst composition according to the present invention further comprises layer (i) comprising at least one precious group metal. According to the present invention, any suitable precious group metal can be used. It is also possible that layer (i) comprises two or more precious group metals. Preferably, the precious group metal is at least one metal selected from Pt, Pd, Rh, Au, and Ir, in particular at least one metal selected from Pt and Pd. More preferably, the layer (i) comprises Pt and Pd.

Thus, according to a further embodiment, the present invention relates to a catalyst composition as disclosed above, wherein the precious group metal is at least one metal selected from Pt, Pd, Rh, Au, and Ir.

According to another embodiment, the present invention relates to a catalyst composition as disclosed above, wherein the precious group metal is Pt and/or Pd.

The layer (i) may contain Pd and/or Pt in a suitable range. Suitable ranges for Pt are between 0 to 100 g/ft$^3$, preferably, layer (i) contains no Pt. In the case Pd is present suitable ranges are between 1 and 200 g/ft$^3$ preferably between about 30 to about 100 g/ft$^3$.

The layer (i) may comprise the precious group metal as such. According to the present invention, the precious group metal may also be dispersed on a suitable support material. According to the present invention, any suitable support material, in particular any porous support material may be used. Preferred support materials, in particular preferred porous support materials are disclosed below.

Layer (i) may comprise further components. Layer (i) may for example comprise further components selected from the group of alumina, e.g. alumina doped with lanthanum, barium, zirconium, ceria, praseodymium or other rare earth elements to a level of 0.1 to 20%. The alumina may comprise up to four different dopands in one alumina. Further components in layer (i) may be ceria or ceria zirconia mixed oxides doped or non doped. Suitable dopands are lanthanum, neodymium, yttrium or rare earth elements in a level from 0.1 to 20%. Up to four different dopands can be present in one Ceria or ceria zirconia mixture. Additionally, layer (i) may contain ZrO2 doped or non doped like the above materials, barium oxide or carbonate.

Suitable amounts for the additional components are for example in the range of 0.5-1.5 g/in$^3$ alumina, 0.1-1 g/in$^3$ ceria or ceria/zirconia, 0.1-1 g/in$^3$, and 0.1-1 g/in$^3$ bariumoxide or barium carbonate.

The catalyst composition according to the present invention also comprises layer (ii) comprising Rh.

Layer (ii) may comprise further components. However, according to the present invention, layer (ii) is preferably substantially free of Pd and/or Pt, particularly preferred substantially free of Pd and Pt.

Reference to "substantially free of Pd and Pt" means that Pd and Pt may be present at a level of less than or equal to approximately 100 ppm.

Thus, according to a further embodiment, the present invention relates to a catalyst composition as disclosed above, wherein the layer (ii) is substantially free of Pd and/or Pt.

Layer (ii) may comprise further components. Layer (ii) may for example comprise components which are mentioned above as suitable further components for layer M.

The catalyst composition according to the present invention further comprises layer (iii) comprising Pd and/or Pt and being substantially free of Ce, Ba and Rh.

Layer (iii) may comprise Pd and/or Pt and preferably comprises Pd and Pt. Therefore, according to a further embodiment, the present invention relates to a catalyst composition as disclosed above, wherein the layer (iii) comprises Pd and Pt.

Layer (iii) may comprise Pd and Pt in a ratio in a range of from 0:5 to 5:1, preferably in a ratio in a range of from 1:4 to 4:2, in particular in a ratio in a range of 1:1.

According to a further embodiment, the present invention therefore relates to a catalyst composition as disclosed above, wherein the ratio of Pd and Pt in the layer (iii) is in the range of from 0:5 to 5:1. Suitable amount of Pt are in the range from 1 g/ft$^3$ to 50 g/ft$^3$. Pd is added to yield the desired ratio of Pt to Pd.

The layer (iii) may comprise Pd and/or Pt as such. According to the present invention, Pd and/or Pt may also be dispersed on a suitable support material. According to the present invention, any suitable support material, in particular any porous support material may be used. Preferred support materials, in particular preferred porous support materials are disclosed below.

Layer (iii) may also comprise further components. Layer (iii) may for example comprise further components selected from the group of alumina doped with lanthanum, zirconium, praseodymium or other rare earth elements other than ceria to a level of 0.1 to 20%. Up to four different dopands can be present in one alumina.

In general, the catalyst composition according to the present invention may suitably contain up to 3.0 wt-% of barium oxide based on the total weight of the layers.

According to the present invention, it is possible that any of the layers (i), (ii), and/or (iii) additionally comprises a porous support material.

Suitable porous support materials are known to the person skilled in the art. The porous support material is preferably a base metal oxide and/or transition metal oxide which are selected from the group including compounds of silica, alumina, zirconia, titania and mixtures thereof.

Preferably, the porous support material is a material with a porosity between 0.2 to 1.2 mL/g, preferable between about 0.2 and about 0.8 mL/g. The porous support material preferably has a BET surface area between 30 and 300 m$^2$/g, more preferably between about 50 and about 200 m$^2$/g.

According to a further embodiment, the present invention relates to a catalyst composition as disclosed above, wherein the layer (i) or the layer (ii) or the layer (iii) or the layers (i) and (ii) or the layers (i) and (iii) or the layers (ii) and (iii) or the layers (i), (ii) and (iii) additionally comprises a porous support material.

A suitable support material according to one or more embodiments is a refractory oxide support.

Reference to a "support" in a catalyst layer refers to a material onto or into which precious metals, stabilizers, promoters, binders, and the like are dispersed or impregnated, respectively. A support can be activated and/or stabilized as desired. Examples of supports include, but are not limited to, high surface area refractory metal oxides, composites containing oxygen storage components, and molecular sieves. One or more embodiments provide that the support of each layer independently comprises a compound that is activated, stabilized, or both selected from the group consisting of, but not limited to, alumina, silica, alumino-silicates, alumina-zirconia, lanthana-alumina, lanthana-zirconia-alumina, baria-alumina, baria lanthana-alumina, alumina-chromia, and alumina-ceria. The support may comprise any suitable materials, for example, a metal oxide comprising gamma-alumina or promoter-stabilized gamma-alumina having a specific surface area of about 50 to 300 m$^2$/g. In certain embodiments, the alumina present in any of the layers comprises zirconia- and lanthanastabilized gamma-alumina in a loading of about 0.2 to about 2.0 g/in$^3$. For example, a suitable alumina is about 0.1-15% lanthana and about 2-25%, and specifically 8-20%, zirconia-stabilized gamma alumina. In one or more embodiments, the alumina comprises gamma alumina stabilized by barium oxide, neodymia, lanthana and combinations thereof. An example of a suitable alumina is about 4% barium oxide and about 4% lanthana stabilized alumina.

According to a further embodiment, the present invention relates to a catalyst composition as disclosed above, wherein the porous support material is selected from base metal oxides and transition metal oxides.

In accordance with embodiments of the present invention, an exhaust gas treatment system or article is provided containing a catalytic member or catalytic converter comprising a substrate on which is coated one or more washcoat layers, each containing one or more catalysts for the abatement of pollutants, especially NOx, HC, and CO. As used herein, the term "washcoat" has its usual meaning in the art of a thin, adherent coating of a catalytic or other material applied to a substrate carrier material, such as a honeycomb-type carrier member, which is sufficiently porous to permit the passage there through of the gas stream being treated.

Optionally, the coating process can be manipulated such that the third layer is applied over only a fraction of the second layer. In this embodiment, the third layer can be applied or coated to the upstream portion of the substrate, thereby creating an upstream poison capture zone. As used herein, the terms "upstream" and "downstream" refer to relative directions according to the flow of an engine exhaust gas stream. The third layer was introduced again to enhance HC/CO/NOX activity this upstream zone where turbulent mass transfer occurs.

The catalyst composition of the present invention can be prepared by any suitable method.

The composition of each layer of the oxidation catalyst of the present invention can be applied to the substrate surfaces by any known means in the art. For example, the catalyst composition can be applied by spray coating, powder coating, or brushing or dipping a surface into the catalyst composition.

In particular, the individual layers can be applied by any suitable method and after one layer has been applied, preferably a drying step or a drying and a calcination step are applied before the next layer is applied.

According to the present invention, each layer can be applied on the substrate or a layer below completely or in form of a zone covering the substrate or layer below in an amount of about 10 to 100% of the length of the substrate or layer below. The remaining uncovered part of the substrate or layer can be covered with another layer as disclosed above. For the uses as TWC catalyst, such a zone covers preferably 30 to 70% of the length of the substrate or layer below.

A representative process is set forth below. The catalyst composition can be prepared in layers on a monolithic carrier. For a first layer of a specific washcoat, finely divided particles of a high surface area refractory metal oxide such as gamma alumina are slurried in an appropriate vehicle, e.g., water. The carrier may then be dipped one or more times in such slurry or the slurry may be coated on the carrier such that there will be deposited on the carrier the desired loading of the metal oxide, e.g., about 0.5 to about 2.5 g/in$^3$. To incorporate components such as precious metals, stabilizers and/or promoters, such components may be incorporated in the slurry as a mixture of water soluble or water-dispersible compounds or complexes. Thereafter the coated carrier is calcined by heating, e.g., at 500-600° C. for about 1 to about 3 hours. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the precious metals are utilized. For example, suitable compounds are palladium nitrate or rhodium nitrate. During the calcination step, or at least during the initial phase of use of the composite, such compounds are converted into a catalytically active form of the metal or a compound thereof.

A suitable method of preparing any layer of the layered catalyst composite of the invention is to prepare a mixture of a solution of a desired precious metal compound (e.g., palladium compound or palladium and platinum compounds) and at least one finely divided, high surface area, refractory metal oxide support, e.g., gamma alumina, which is sufficiently dry to absorb substantially all of the solution to form a wet solid which later combined with water to form a coatable slurry. In one or more embodiments, the slurry is acidic, having a pH of about 2 to less than about 7. The pH of the slurry may be lowered by the addition of a minor amount of an inorganic or an organic acid to the slurry. Inorganic acids include, but are not limited to, nitric acid. Organic acids include, but are not limited to, as acetic acid or polyacids, specifically difunctional acids, more specifically dicarboxylic acids. Dicarboxylic acids include, but are not limited to oxalic, malonic, succinic, glutaric, adipic, maleic, fumaric, phthalic, tartaric, and the like. Combinations of both organic and inorganic acids can be considered when amounts of each are desired.

In one embodiment, the slurry is thereafter comminuted to result in substantially all of the solids having particle sizes of less than about 50 microns, preferably between about 0.1-15 microns, in an average diameter. The comminution may be accomplished in a ball mill or other similar equipment, and the solids content of the slurry may be, e.g., about 15-60 wt. %, more particularly about 25-40 wt. %.

Additional layers, i.e., the second, third, fourth, and fifth layers may be prepared and deposited upon the first layer in the same manner as described above for deposition of the first layer upon the carrier.

According to a further aspect, the present invention relates to a method for treating an exhaust gas stream, the method comprising the steps of:
  (i) providing a catalyst composition comprising:
    a carrier substrate;
    a layer (i) coated on said carrier substrate comprising at least one precious group metal;
    a layer (ii) comprising Rh;
    a layer (iii) comprising Pd and/or Pt and being substantially free of Ce, Ba and Rh,
    wherein the layer (iii) has a lower weight than the layer (i) or the layer (ii);

(ii) contacting said exhaust gas stream with said catalyst composition for the treatment of exhaust gas emissions.

According to a further embodiment, the present invention relates to a method for treating an exhaust gas stream as disclosed above, wherein in the catalyst composition the layer (ii) is coated over the layer (i) and the layer (iii) is coated over the layer (ii).

According to a further embodiment, the present invention relates to a method for treating an exhaust gas stream as disclosed above, wherein in the catalyst composition the layer (iii) is coated over the layer (i) and the layer (ii) is coated over the layer (iii).

Furthermore, the catalyst composition as disclosed above including preferred embodiments can be used for the method for treating an exhaust gas stream according to the present invention.

A further aspect of the present invention includes a method comprising locating in an exhaust system a multi-layered catalyst composition having a catalytic material on a carrier, the catalyst composition comprising:
  a carrier substrate;
  a layer (i) coated on said carrier substrate comprising at least one precious group metal;
  a layer (ii) comprising Rh;
  a layer (iii) comprising Pd and/or Pt and being substantially free of Ce, Ba and Rh,
  wherein the layer (iii) has a lower weight than the layer (i) or the layer (ii).

Further preferred embodiments of the catalyst composition according to the present invention are disclosed above.

Before describing several exemplary embodiments of the invention, it is to be understood that the invention is not limited to the details of construction or process steps set forth in the following examples. The invention is capable of other embodiments and of being practiced in various ways. Possible embodiments of the present invention are fore example the following embodiments 1 to 14:

1. A catalyst composition comprising:
  a carrier substrate;
  a layer (i) coated on said carrier substrate comprising at least one precious group metal;
  a layer (ii) comprising Rh;
  a layer (iii) comprising Pd and/or Pt and being substantially free of Ce, Ba and Rh,
  wherein the layer (iii) has a lower weight than the layer (i) or the layer (ii).
2. The catalyst composition according to embodiment 1, wherein the layer (ii) is coated over the layer (i) and the layer (iii) is coated over the layer (ii).
3. The catalyst composition according to embodiment 1, wherein the layer (iii) is coated over the layer (i) and the layer (ii) is coated over the layer (iii).
4. The catalyst composition according to any of embodiments 1 to 3, wherein the weight of the layer (iii) is about 80% or less of the weight of the layer (i).
5. The catalyst composition according to any of embodiments 1 to 4, wherein the precious group metal is at least one metal selected from Pt, Pd, Rh, Au, and Ir.
6. The catalyst composition according to any of embodiments 1 to 5, wherein the precious group metal is Pt and/or Pd.
7. The catalyst composition of any of embodiments 1 to 6, wherein the layer (ii) is substantially free of Pd and/or Pt.
8. The catalyst composition of any of embodiments 1 to 7, wherein the layer (iii) comprises Pd and Pt.
9. The catalyst composition of any of embodiments 1 to 8, wherein the ratio of Pd and Pt in the layer (iii) is in the range of from 0:5 to 5:1.
10. A catalyst composition according to any of embodiments 1 to 9, wherein the layer (i) or the layer (ii) or the layer (iii) or the layers (i) and (ii) or the layers (i) and (iii) or the layers (ii) and (iii) or the layers (i), (ii) and (iii) additionally comprises a porous support material.
11. The catalyst composition of any of embodiments 1 to 10, wherein the porous support material is selected from base metal oxides and transition metal oxides.
12. A method for treating an exhaust gas stream, the method comprising the steps of:
  (i) providing a catalyst composition comprising:
    a carrier substrate;
    a layer (i) coated on said carrier substrate comprising at least one precious group metal;
    a layer (ii) comprising Rh;
    a layer (iii) comprising Pd and/or Pt and being substantially free of Ce, Ba and Rh,
    wherein the layer (iii) has a lower weight than the layer (i) or the layer (ii);
  (ii) contacting said exhaust gas stream with said catalyst composition for the treatment of exhaust gas emissions.
13. The method according to embodiment 12, wherein in the catalyst composition the layer (ii) is coated over the layer (i) and the layer (iii) is coated over the layer (ii).
14. The method according to embodiment 12, wherein in the catalyst composition the layer (iii) is coated over the layer (i) and the layer (ii) is coated over the layer (iii).

The present invention is further illustrated by way of the following examples.

EXAMPLES

1. Detailed Preparation Procedure, Example 1
Catalyst C1

A composite having a catalytic material was prepared using three layers: an inner layer, a middle layer, and an outer layer. In this example, the composition is generally referred to as UC/Pd/Pd (where UC refers to "undercoat"). The layered catalyst composite contained platinum, palladium and rhodium with a total precious metal loading of 105 g/ft$^3$ and with a Pt/Pd/Rh ratio of 8/95/2. The substrate had a volume of 51.2 in$^3$ (0.84 L), a cell density of 600 cells per square inch, and a wall thickness of approximately 100 µm. The catalytic material as a whole had an OSC content of 29% by weight.

In summary, the inner layer and the middle layer have equal thickness while the outer has only 60% of the thickness of the other layers.

The top layer contains platinum but no ceria or baria and no Rh. The middle layer contains no Pd but Rh and the bottom layer contains Pd only.

The layers were prepared as follows:

1.1 Inner Layer

The components present in the inner layer were high surface area gamma alumina doped with 4% of lanthanum, a ceria-zirconia composite with 45% ceria by weight, zirconium oxide, barium oxide and a binder, at concentrations of approximately 67%, 18%, 3%, 6% and 3%, respectively, based on the calcined weight of the catalyst. The total loading of the inner layer was 1.649 g/in$^3$. The zirconium oxide was introduced as an acetate colloidal solution and the barium oxide as barium acetate solution.

Palladium in the form of a Palladium nitrate solution was impregnated by planetary mixer (P-mixer) onto the stabilized alumina to form a wet powder while achieving incipient wetness. The amounts of Pd was chosen to achieve final concentration of 85.5 g/ft$^3$ of Pd. An aqueous slurry was formed by combining all of the above components with water, and milling to a particle size of 90% less than 10 microns. The slurry was coated onto a cordierite carrier using deposition methods known in the art for depositing the catalyst on a cordierite substrate. After coating, the carrier plus the inner layer were dried and then calcined at a temperature of 500° C. for about 1 hour.

1.2 Middle Layer

The components present in the middle layer were high surface area gamma alumina doped with 4% of lanthanum, a ceria-zirconia composite with 28% ceria by weight, zirconium oxide, and barium oxide, at concentrations of approximately 49%, 49%, 1.5%, 1.5% and 3%, respectively, based on the calcined weight of the catalyst. The barium oxide was introduced as an acetate colloidal solution. The total loading of the middle layer was 1.65 g/in$^3$.

Rhodium in the form of a Rhodium nitrate solution was impregnated by planetary mixer (P-mixer) onto the stabilized alumina to form a wet powder while achieving incipient wetness. The amounts of Rh was chosen to achieve final concentration of 2 g/ft$^3$ of Rh. An aqueous slurry was formed by combining all of the above components with water, and milling to a particle size of 90% less than 10 mlcrons. The slurry was coated onto the cordierite carrier over the inner layer using deposition methods known in the art for depositing the catalyst on a cordierite substrate. After coating, the carrier plus the inner and middle layers were dried, and then calcined at a temperature of 550° C. for about 1 hour.

1.3 Outer Layer

The components present in the outer layer were high surface area gamma alumina doped with 20% of zirconium oxide, zirconium oxide and binder, at concentrations of approximately 94%, 2.4% and 2.4%, respectively, based on the caltined weight of the catalyst. The total loading of the middle layer was 1 g/in$^3$.

Platinum in the form of a platinum tetra methyl ammonium hydroxide complex solution was impregnated by planetary mixer (P-mixer) and subsequently Palladium in the form of a Palladium nitrate solution was impregnated onto the stabilized alumina to form a wet powder while achieving incipient wetness. The amounts of Pt and Pd were chosen to achieve final concentration of 8 g/ft$^3$ of Pt and 9,5 g/ft$^3$ of Pd. An aqueous slurry was formed by combining all of the above components with water, and milling to a particle size of 90% less than 10 microns. The slurry was coated onto the cordierite carrier over the inner layer using deposition methods known in the art for depositing the catalyst on a cordierite substrate. After coating, the carrier plus the inner and middle layers were dried, and then calcined at a temperature of 550°C for about 1 hour, 2. Detailed Preparation Procedure, Example 2
Catalyst C2

2.1 Inner Layer

The components present in the inner layer were high surface area gamma alumina doped with 4% of lanthanum, a ceria-zirconia composite with 45% ceria by weight, zirconium oxide, barium oxide and a binder, at concentrations of approximately 67%, 18%, 3%, 6% and 3%, respectively, based on the calcined weight of the catalyst. The total loading of the inner layer was 1.60 g/in$^3$. The zirconium oxide was introduced as an acetate colloidal solution and the barium oxide as barium acetate solution.

Palladium in the form of a Palladium nitrate solution was impregnated by planetary mixer (P-mixer) onto the stabilized alumina to form a wet powder while achieving incipient wetness. The amounts of Pd was chosen to achieve final concentration of 66 g/ft$^3$ of Pd. An aqueous slurry was formed by combining all of the above components with water, and milling to a particle size of 90% less than 10 microns. The slurry was coated onto a cordierite carrier using deposition methods known in the art for depositing the catalyst on a cordierite substrate. After coating, the carrier plus the inner layer were dried and then calcined at a temperature of 500° C. for about 1 hour.

2.2 Middle Layer

The components present in the middle layer were high surface area gamma alumina doped with 4% of lanthanum, a ceria-zirconia composite with 28% ceria by weight, zirconium oxide, and barium oxide, at concentrations of approximately 49%, 49%, 1.5%, 1.5% and 3%, respectively, based on the calcined weight of the catalyst. The barium oxide was introduced as an acetate colloidal solution. The total loading of the middle layer was 1.65 g/in$^3$.

Rhodium in the form of a Rhodium nitrate solution was impregnated by planetary mixer (P-mixer) onto the stabilized alumina to form a wet powder while achieving incipient wetness. The amounts of Rh was chosen to achieve final concentration of 2 g/ft$^3$ of Rh An aqueous slurry was formed by combining all of the above components with water, and milling to a particle size of 90% less than 10 mlcrons. The slurry was coated onto the cordierite carrier over the inner layer using deposition methods known in the art for depositing the catalyst on a cordierite substrate. After coating, the carrier plus the inner and middle layers were dried, and then calcined at a temperature of 550° C. for about 1 hour.

2.3 Outer Layer

The components present in the outer layer were high surface area gamma alumina doped with 20% of zirconium oxide, zirconium oxide and binder, at concerttrations of approximately 94%, 2.4% and 2.4%, respectively, based on the calcined weight of the catalyst. The total loading of the middle layer was 1 Win$^s$.

Palladium in the form of a Palladium nitrate solution was impregnated by planetary mixer (P-mixer) onto the stabilized alumina to form a wet powder while achieving incipient wetness. The amount of Pd was chosen to achieve final concentration of 36 g/ft$^3$ of Pd. An aqueous slurry was formed by combining all of the above components with water, and milling to a particle size of 90% less than 10 microns. The slurry was coated onto the, cordierite carrier over the inner layer using deposition methods known in the art for depositing the catalyst on a cordierite substrate. After coating, the carrier plus the inner and middle layers were dried, and then calcined at a temperature of 550°C for about 1 hour.

3. Detailed Preparation Procedure, Example 3
Catalyst C3

3.1 Inner Layer

The components present in the inner layer were high surface area gamma alumina doped with 4% of lanthanum, a ceria-zirconia composite with 45% cede by weight, zirconium oxide, barium oxide and a binder, at concentrations of approximately 67%, 18%, 3%, 6% and 3%, respectively, based on the calcined weight of the catalyst. The total loading of the inner layer was 1.649 g/in$^3$. The zirconium oxide was introduced as an acetate colloidal solution and the barium oxide as barium acetate solution.

Palladium in the form of a Palladium nitrate solution was impregnated by planetary mixer (P-mixer) onto the stabilized alumina to form a wet powder while achieving incipient wetness. The amounts of Pd was chosen to achieve final concentration of 93 g/ft³ of Pd. An aqueous slurry was formed by combining all of the above components with water, and milling to a particle size of 90% less than 10 microns. The slurry was coated onto a cordierite carrier using deposition methods known in the art for depositing the catalyst on a cordierite substrate. After coating, the carrier plus the inner layer were dried and then calcined at a temperature of 500° C. for about 1 hour.

3.2 Middle Layer

The components present in the middle layer were high surface area gamma alumina doped with 4% of lanthanum, a ceria-zirconia composite with 28% ceria by weight, zirconium oxide, and barium oxide, at concentrations of approximately 49%, 49%, 1.5%, 1.5% and 3%, respectively, based on the calcined weight of the catalyst. The barium oxide was introduced as an acetate colloidal solution. The total loading of the middle layer was 1.65 g/in³.

Rhodium in the form of a Rhodium nitrate solution was impregnated by planetary mixer (P-mixer) onto the stabilized alumina to form a wet powder while achieving incipient wetness. The amounts of Rh was chosen to achieve final concentration of 2 g/ft³ of Rh. An aqueous slurry was formed by combining all of the above components with water, and milling to a particle size of 90% less than 10 mlcrons. The slurry was coated onto the cordierite carrier over the inner layer using deposition methods known in the art for depositing the catalyst on a cordierite substrate. After coating, the carrier plus the inner and middle layers were dried, and then calcined at a temperature of 550° C. for about 1 hour.

3.3 Outer Layer

The components present in the outer layer were high surface area gamma alumina doped with 20% of zirconium oxide, zirconium oxide and binder, at concentrations of approximately 94%, 2.4% and 2.4%, respectively, based on the caltined weight of the catalyst. The total loading of the middle layer was 1 g/in³.

Platinum in the form of a platinum tetra methyl ammonium hydroxide complex solution was impregnated by planetary mixer (P-mixer) and subsequently Palladium in the form of a Palladium nitrate solution was impregnated onto the stabilized alumina to form a wet powder while achieving incipient wetness. The amounts of Pt and Pd were chosen to achieve final concentration of 8 g/ft³ of Pt and 2 g/ft³ of Pd. An aqueous slurry was formed by combining all of the above components with water, and milling to a particle size of 90% less than 10 microns. The slurry was coated onto the cordierite carrier over the inner layer using deposition methods known in the art for depositing the catalyst on a cordierite substrate. After coating, the carrier plus the inner and middle layers were dried, and then calcined at a temperature of 550°C for about 1 hour.

4. Detailed Preparation Procedure, Example 4 Catalyst C4

4.1 Inner Layer

The components present in the inner layer were high surface area gamma alumina doped with 4% of lanthanum, a ceria-zirconia composite with 45% ceria by weight, zirconium oxide, barium oxide and a binder, at concentrations of approximately 67%, 18%, 3%, 6% and 3%, respectively, based on the calcined weight of the catalyst. The total loading of the inner layer was 1.649 g/in³. The zirconium oxide was introduced as an acetate colloidal solution and the barium oxide as barium acetate solution.

Palladium in the form of a Palladium nitrate solution was impregnated by planetary mixer (P-mixer) onto the stabilized alumina to form a wet powder while achieving incipient wetness. The amounts of Pd was chosen to achieve final concentration of 55 g/ft³ of Pd. An aqueous slurry was formed by combining all of the above components with water, and milling to a particle size of 90% less than 10 microns. The slurry was coated onto a cordierite carrier using deposition methods known in the art for depositing the catalyst on a cordierite substrate. After coating, the carrier plus the inner layer were dried and then calcined at a temperature of 500° C. for about 1 hour.

4.2 Middle Layer

The components present in the middle layer were high surface area gamma alumina doped with 4% of lanthanum, a ceria-zirconia composite with 28% ceria by weight, zirconium oxide, and barium oxide, at concentrations of approximately 49%, 49%, 1.5%, 1.5% and 3%, respectively, based on the calcined weight of the catalyst. The barium oxide was introduced as an acetate colloidal solution. The total loading of the middle layer was 1.65 g/in³.

Rhodium in the form of a Rhodium nitrate solution was impregnated by planetary mixer (P-mixer) onto the stabilized alumina to form a wet powder while achieving incipient wetness. The amounts of Rh was chosen to achieve final concentration of 2 g/ft³ of Rh. An aqueous slurry was formed by combining all of the above components with water, and milling to a particle size of 90% less than 10 mlcrons. The slurry was coated onto the cordierite carrier over the inner layer using deposition methods known in the art for depositing the catalyst on a cordierite substrate. After coating, the carrier plus the inner and middle layers were dried, and then calcined at a temperature of 550° C. for about 1 hour.

4.3 Outer Layer

The components present in the outer layer were high surface area gamma alumina doped with 20% of zirconium oxide, zirconium oxide and binder, at concentrations of approximately 94%, 2.4% and 2.4%, respectively, based on the calcined weight of the catalyst. The total loading of the middle layer was 1 g/in³.

Platinum in the form of a platinum tetra methyl ammonium hydroxide complex solution was impregnated by planetary mixer (P-mixer) and subsequently Palladium in the form of a palladium nitrate solution was impregnated onto the stabilized alumina to form a wet powder while achieving incipient wetness. The amounts of Pt and Pd were chosen to achieve final concentration of 8 g/ft³ of Pt. and 40 g/ft.³of Pd. An aqueous slurry was formed by combining all of the above components with water, and milling to a particle size of 90% less than 10 microns. The slurry was coated onto the cordierite carrier over the inner layer using deposition methods known in the art for depositing the catalyst on a cordierite substrate. After coating, the carrier plus the inner and middle layers were dried, and then calcined at a temperature of 550°C. for about 1 hour.

5. Detailed Preparation Procedure, Reference Example 1 with Pt, Catalyst R1

5.1 Inner Layer

The components present in the inner layer were high surface area gamma alumina, a ceria-zirconia composite with 45% ceria by weight, zirconium oxide and a binder, at concentrations of approximately 23%, 70%, 0.5% and 0.3%, respectively, based on the calcined weight of the catalyst. The total loading of the inner layer was 1.075 g/in³. The zirconium oxide was introduced as an acetate colloidal solution and the barium oxide as barium acetate solution.

An aqueous slurry was formed by combining all of the above components with water, and milling to a particle size of 90% less than 10 microns. The slurry was coated onto a cordierite carrier using deposition methods known in the art for depositing the catalyst on a cordierite substrate. After coating, the carrier plus the inner layer were dried and then calcined at a temperature of 500° C. for about 1 hour.

5.2 Middle Layer

The components present in the middle layer were high surface area gamma alumina doped with 4% of lanthanum, a ceria-zirconia composite with 28% ceria by weight, and barium oxide, at concentrations of approximately 59%, 36%, and 5% respectively, based on the calcined weight of the catalyst. The barium oxide was introduced as an acetate colloidal solution. The total loading of the middle layer was 2.05 g/in$^3$.

Palladium in the form of a Palladium nitrate solution was impregnated by planetary mixer (P-mixer) onto the stabilized alumina to form a wet powder while achieving incipient wetness. The amounts of Pd was chosen to achieve final concentration of 95 g/ft$^3$ of Pd. An aqueous slurry was formed by combining all of the above components with water, and milling to a particle size of 90% less than 10 microns. The slurry was coated onto the cordierite carrier over the inner layer using deposition methods known in the art for depositing the catalyst on a cordierite substrate. After coating, the carrier plus the inner and middle layers were dried, and then calcined at a temperature of 550° C. for about 1 hour.

5.3 Outer Layer

The components present in the outer layer were high surface area gamma alumina doped, a ceria-zirconia composite with 45% ceria by weight, zirconium oxide, barium oxide and a binder, at concentrations of approximately 78%, 16%, 3%, 3% and 3%, respectively, based on the calcined weight of the catalyst, zirconium oxide and binder, at concentrations of approximately 94%, 2.4% and 2.4%, respectively, based on the calcined weight of the catalyst. The total loading of the middle layer was 1.6 g/in$^3$.

Rhodium in the form of a Rhodium nitrate solution and Platinum in the form of a platinum tetra methyl ammonium hydroxide complex solution was impregnated by planetary mixer (P-mixer) onto the stabilized alumina to form a wet powder while achieving incipent wetness. The amounts of Pt and Rh were chosen to achieve final concentration of 8 g/ft$^3$ of Pt and 2 g/ft$^3$ of Rh. An aqueous slurry was formed by coming all of the abouve components with water, and milling to a particle size of 90% less than 10 microns. The slurry was coated onto the cordierite carrier over the inner layer using deposition methods known in the art for depositing the catalyst on a cordierite substrate. After coating, the carrier plus the inner and middle layers were dried, and then calcined at a temperature of 550°c. for 1 hour.

6. Detailed Preparation Procedure, Reference Example 2 (Catalyst R2)

6.1 Inner Layer

The components present in the inner layer were high surface area gamma alumina doped, barium oxide and lanthanum oxide, at concentrations of approximately 93%, 5%, and 3% respectively, based on the calcined weight of the catalyst. The barium oxide was introduced as an acetate colloidal solution. The total loading of the bottom layer was 1.85 g/in$^3$.

Palladium in the form of a Palladium nitrate solution was impregnated by planetary mixer (P-mixer) onto the stabilized alumina to form a wet powder while achieving incipient wetness. The amounts of Pd was chosen to achieve final concentration of 100 g/ft$^3$ of Pd. An aqueous slurry was formed by combining all of the above components with water, and milling to a particle size of 90% less than 10 microns. The slurry was coated onto the cordierite carrier over the inner layer using deposition methods known in the art for depositing the catalyst on a cordierite substrate. After coating, the carrier plus the inner and middle layers were dried, and then calcined at a temperature of 550° C. for about 1 hour.

6.2 Outer Layer

The components present in the outer layer were high surface area gamma alumina doped, a ceria-zirconia composite with 10% ceria by weight, barium oxide and a binder, at concentrations of approximately 58%, 36%, 2%, and 3%, respectively, based on the calcined weight of the catalyst. The total loading of the middle layer was 2.59 g/in$^3$.

Rhodium in the form of a Rhodium nitrate solution and Palladium in the form of a Palladium nitrate solution was impregnated separately by planetary mixer (P-mixer) onto the stabilized alumina to form a wet powder while achieving incipient wetness. The amounts of Pd and Rh were chosen to achieve final concentration of 3.5 g/ft$^3$ of Pd and 10 g/ft$^3$ of Rh. An aqueous slurry was formed by combining all of the above components with water, and milling to a particle size of 90% less than 10 microns. The slurry was coated onto the cordierite carrier over the inner layer using deposition methods known in the art for depositing the catalyst on a cordierite substrate. After coating, the carrier plus the inner and middle layers were dried, and then calcined at a temperature of 550°C for about 1 hour.

7. Detailed Preparation Procedure, Reference Example 3 (Catalyst R3)

7.1 Inner layer

The components present in the inner layer were high surface area gamma alumina doped with 4% of lanthanum, zirconium oxide, barium oxide and a binder, at concentrations of approximately 88%, 3%, 6%, 3%, respectively, based on the calcined weight of the catalyst. The total loading of the inner layer was 1.70 g/in$^3$. The zirconium oxide was introduced as an acetate colloidal solution and the barium oxide as barium acetate solution.

Palladium in the form of a Palladium nitrate solution was impregnated by planetary mixer (P-mixer) onto the stabilized alumina to form a wet powder while achieving incipient wetness. The amounts of Pd was chosen to achieve final concentration of 82 g/ft$^3$ of Pd. An aqueous slurry was formed by combining all of the above components with water, and milling to a particle size of 90% less than 10 microns. The slurry was coated onto a cordierite carrier using deposition methods known in the art for depositing the catalyst on a cordierite substrate. After coating, the carrier plus the inner layer were dried and then calcined at a temperature of 500° C. for about 1 hour.

7.2 Middle Layer

The components present in the middle layer were high surface area gamma alumina doped with 20% of zriconia, a ceria-zirconia composite with 28% ceria by weight, zirconium oxide, and barium oxide, at concentrations of approximately 49%, 49%, 1.5%, 1.5% and 3%, respectively, based on the calcined weight of the catalyst. The barium oxide was introduced as an acetate colloidal solution. The total loading of the middle layer was 1.65 g/in$^3$.

Rhodium in the form of a Rhodium nitrate solution was impregnated by planetary mixer (P-mixer) onto the stabilized alumina to form a wet powder while achieving incipient wetness. The amounts of Rh was chosen to achieve final concentration of 6 g/ft³ of Rh. An aqueous slurry was formed by combining all of the above components with water, and milling to a particle size of 90% less than 10 mlcrons. The slurry was coated onto the cordierite carrier over the inner layer using deposition methods known in the art for depositing the catalyst on a cordierite substrate. After coating, the carrier plus the inner and middle layers were dried, and then calcined at a temperature of 550° C. for about 1 hour.

7.3 Outer Layer

The components present in the outer layer were high surface area gamma alumina doped with 0.4% of lanthanum oxide, a ceria-zirconia composite with 28% ceria by weight, barium oxide, zirconium oxide and binder, at concentrations of approximately 65%, 28%, 2%, 2% and 2%, respectively, based on the calcined weight of the catalyst. The total loading of the outer layer was 1.1 g/in³.

Palladium in the form of a Palladium nitrate solution was impregnated by planetary mixer (P-mixer) onto the stabilized alumina to form a wet powder while achieving incipient wetness. The amounts of Pd was chosen to achieve final concentration of 2 g/ft³ of Pd. An aqueous slurry was formed by combining all of the above components with water, and milling to a particle size of 90% less than 10 microns. The slurry was coated onto the cordierite carrier over the inner layer using deposition methods known in the art for depositing the catalyst on a cordierite substrate. After coating, the carrier plus the inner and middle layers were dried, and then calcined at a temperature of 550° C. for about 1 hour.

8. Results: Hydrocarbon Oxidation Efficiency at Engine Bench at 290° C. at Lean Exhaust Gas Conditions The catalysts were aged prior to test for 25 h at 950° C. maximum catalyst bed temperature with secondary air injection. This procedure yield in intervals of 25 seconds at 950° C. bed temperature at lambda 1 and 8 seconds at Lambda 2 with a minimum temperature at 650° C.

Afterwards the Hydrocarbon oxidation was evaluated by setting the engine to operate at Lambda 2.5 at an exhaust gas flow of 41 m³/h, 135 ppm hydrocarbon and a exhaust gas temperature at catalyst inlet of 290° C.

Set 1:

| Catalyst | Hydrocarbon oxidation efficiency at 290° C. [%] |
|---|---|
| C1 | 75 |
| C2 | 70 |
| R3 | 70 |
| R1 | 69 |

Set 2

| Catalyst | Hydrocarbon oxidation efficiency at 290° C. [%] |
|---|---|
| R2 | 62 |
| C1 | 68 |
| R1 | 63 |
| C4 | 66 |

Set 3

| Catalyst | Hydrocarbon oxidation efficiency at 280° C. [%] |
|---|---|
| C1 | 69 |
| C3 | 71 |

The invention claimed is:

1. A catalyst composition comprising:
   a carrier substrate;
   a layer (i) coated on said carrier substrate comprising at least one precious group metal;
   a layer (ii) comprising Rh;
   a layer (iii) comprising Pd and/or Pt and being substantially free of Ce, Ba and Rh,
   wherein the layer (iii) has a lower weight than the layer (i) or the layer (ii).

2. The catalyst composition according to claim 1, wherein the layer (ii) is coated over the layer (i) and the layer (iii) is coated over the layer (ii).

3. The catalyst composition according to claim 1, wherein the layer (iii) is coated over the layer (i) and the layer (ii) is coated over the layer (iii).

4. The catalyst composition according to any of claims 1 to 3, wherein the weight of the layer (iii) is about 80% or less of the weight of the layer (i).

5. The catalyst composition according to any of claims 1 to 4, wherein the precious group metal is at least one metal selected from the group consisting of Pt, Pd, Rh, Au, and Ir.

6. The catalyst composition according to any of claims 1 to 5, wherein the precious group metal is Pt and/or Pd.

7. The catalyst composition according to any of claims 1 to 6, wherein the layer (ii) is substantially free of Pd and/or Pt.

8. The catalyst composition according to any of claims 1 to 7, wherein the layer (iii) comprises Pd and Pt.

9. The catalyst composition according to any of claims 1 to 8, wherein the ratio of Pd and Pt in the layer (iii) is in the range of from 0:5 to 5;1.

10. A catalyst composition according to any of claims 1 to 9, wherein the layer (i), the layer (ii), or the layer (iii) additionally comprises a porous support material.

11. The catalyst composition of any according to claims 1 to 10, wherein the porous support material is selected from the group consisting of base metal oxides and transition metal oxides.

12. A method for treating an exhaust gas stream the method comprising the steps of:
    (i) providing a catalyst composition comprising:
       a carrier substrate;
       a layer (A) coated on said carrier substrate comprising at least one precious group metal;
       a layer (B) comprising Rh;
       a layer (C) comprising Pd and Pt and being substantially free of Ce, Ba and Rh,
       wherein the layer (C) has a lower weight than the layer (A) or the layer (B);
    (ii) contacting said exhaust gas stream with said catalyst composition for the treatment of exhaust gas emissions.

13. The method according to claim 12, wherein in the catalyst composition the layer (ii) is coated over the layer (i) and the layer (iii) is coated over the layer (ii).

14. The method according to claim 12, wherein in the catalyst composition the layer (iii) is coated over the layer (i) and the layer (ii) is coated over the layer (iii).

* * * * *